(12) United States Patent
Borovsky et al.

(10) Patent No.: US 12,323,575 B2
(45) Date of Patent: Jun. 3, 2025

(54) DIMENSIONAL CALIBRATION OF THE FIELD-OF-VIEW OF A SINGLE CAMERA

(71) Applicants: Igor Borovsky, Rehovot (IL); Victor Belkin, Jerusalem (IL)

(72) Inventors: Igor Borovsky, Rehovot (IL); Victor Belkin, Jerusalem (IL)

(73) Assignees: Igor Borovsky, Rehovot (IL); Victor Belkin, Jerusalem (IL)

( * ) Notice: Subject to any disclaimer, the term of this patent is extended or adjusted under 35 U.S.C. 154(b) by 437 days.

(21) Appl. No.: 17/785,259

(22) PCT Filed: Dec. 13, 2020

(86) PCT No.: PCT/IL2020/051283
§ 371 (c)(1),
(2) Date: Jun. 14, 2022

(87) PCT Pub. No.: WO2021/124319
PCT Pub. Date: Jun. 24, 2021

(65) Prior Publication Data
US 2023/0027236 A1    Jan. 26, 2023

(30) Foreign Application Priority Data
Dec. 17, 2019   (IL) .......................................... 271487

(51) Int. Cl.
*G06T 7/80*        (2017.01)
*G01C 11/00*      (2006.01)
(Continued)

(52) U.S. Cl.
CPC ........... *H04N 17/002* (2013.01); *G01C 11/00* (2013.01); *G06T 7/60* (2013.01); *G06T 7/70* (2017.01);
(Continued)

(58) Field of Classification Search
CPC ........ H04N 17/002; G01C 11/00; G06T 7/60; G06T 7/70; G06T 7/80;
(Continued)

(56) References Cited

U.S. PATENT DOCUMENTS 5,467,634 A * 11/1995 Brady ................. G01B 21/042
348/148
5,742,699 A    4/1998 Adkins et al.
(Continued)

FOREIGN PATENT DOCUMENTS

CA        2956319         7/2018

OTHER PUBLICATIONS

PCT International Search Report (w/ English translation) for corresponding PCT Application No. PCT/IL2020/051283, mailed on Mar. 16, 2021, 5 pages.

*Primary Examiner* — Huo Long Chen
(74) *Attorney, Agent, or Firm* — Dority & Manning, P.A.

(57) ABSTRACT

A method for calibrating an active FOV of a single camera, wherein from the calibration of the cameras active FOV, a coordinate matrix is obtained which remotely produces a virtual interpolation measurement network at any point within an image (a frame) extracted from a video stream (recorded by the single camera), while eliminating the need to be physically located at the actual location where the video stream has been recorded. According to an embodiment of the invention, the basis of the active FOV of a camera is the ability to obtain (measure) coordinates of the measurement points marked on a calibration board.

8 Claims, 12 Drawing Sheets

(51) Int. Cl.
    *G06T 7/60*    (2017.01)
    *G06T 7/70*    (2017.01)
    *H04N 17/00*   (2006.01)

(52) U.S. Cl.
    CPC ...... *G06T 7/80* (2017.01); *G06T 2207/10016* (2013.01); *G06T 2207/30244* (2013.01)

(58) Field of Classification Search
    CPC . G06T 2207/10016; G06T 2207/30244; G06T 2207/30208; G01B 11/022; G01B 21/042
    See application file for complete search history.

(56)                References Cited

U.S. PATENT DOCUMENTS

| | | | |
|---|---|---|---|
| 2011/0176007 A1* | 7/2011 | Ding | H04N 9/3194 |
| | | | 348/189 |
| 2012/0206602 A1 | 8/2012 | Clucas et al. | |
| 2016/0104174 A1* | 4/2016 | Matsumoto | G06V 20/53 |
| | | | 705/7.29 |
| 2017/0287166 A1 | 10/2017 | Claveau et al. | |
| 2022/0067971 A1* | 3/2022 | Alexovski | G06T 7/80 |

* cited by examiner

| X1_1 Y1_1 | X1_2 Y1_2 | X1_3 Y1_3 | X1_4 Y1_4 | X1_5 Y1_5 | X1_6 Y1_6 | X1_7 Y1_7 | X1_8 Y1_8 |
|---|---|---|---|---|---|---|---|
| X2_1 Y2_1 | X2_2 Y2_2 | X2_3 Y2_3 | X2_4 Y2_4 | X2_5 Y2_5 | X2_6 Y2_6 | X2_7 Y2_7 | X2_8 Y2_8 |
| ⋮ | ⋮ | ⋮ | ⋮ | ⋮ | ⋮ | ⋮ | ⋮ |
| X19_1 Y19_1 | X19_2 Y19_2 | X19_3 Y19_3 | X19_4 Y19_4 | X19_5 Y19_5 | X19_6 Y19_6 | X19_7 Y19_7 | X19_8 Y19_8 |
| X20_1 Y20_1 | X20_2 Y20_2 | X20_3 Y20_3 | X20_4 Y20_4 | X20_5 Y20_5 | X20_6 Y20_6 | X20_7 Y20_7 | X20_8 Y20_8 |
| X21_1 Y21_1 | X21_2 Y21_2 | X21_3 Y21_3 | X21_4 Y21_4 | X21_5 Y21_5 | X21_6 Y21_6 | X21_7 Y21_7 | X21_8 Y21_8 |

Fig. 6

DIMENSIONAL CALIBRATION OF THE FIELD-OF-VIEW OF A SINGLE CAMERA

FIELD OF THE INVENTION

The present invention relates to the field of photogrammetry-based systems. More particularly, the invention relates to a system and method for calibrating the field of view (FOV) of a camera such as video cameras, security cameras, etc.

BACKGROUND OF THE INVENTION

Photogrammetry is used to obtain reliable information about physical objects and the environment through recording, measuring, and interpreting photographic images and patterns of electromagnetic radiant imagery and other phenomena.

Each camera has a field of view, which depends on the parameters of the camera, such as camera deployment angle, height level, type of lens, etc. This dependence causes objects that are viewed at different distances from the lens of the camera to appear in different dimensions that do not correspond to the real dimensions due to distortions and distance of each object from the camera. Therefore, without the calibration, it is not possible to know the absolute sizes and distances of different objects in a video stream.

Photogrammetry usually uses the "Reverse Projection" method to measure objects in a photograph or video stream. It can be used to determine if an individual could be excluded or included as a suspect based on height. In such a method, a calibration board is placed at the exact location of an object to be measured from a recorded video stream (an image of a single frame) and combine this image with the image of the same object into a uniform image.

Today, there are methods to calibrate the camera itself to get the best image in terms of quality, focus, etc. These methods do not relate to calibrating the field of view of the camera and do not give a depth perspective. Therefore, these methods cannot obtain information about the dimensions of objects in the image, and this kind of calibration is done to correct distortions in the image and improve image quality. Moreover, these calibration methods lack the ability to facilitate the usage of Reverse Projection for object measuring tasks and monitoring video streams.

In terms of measuring the size of objects in an image, the methods that are being used today require more than one camera, for example, the stereoscopic method, which uses two or more cameras.

Common analytical video technologies that are being used today include a restriction on the use of face and color recognition methods to identify a person in the video stream. In cases of a person whose face is hidden (for example, when committing a crime), the identification methods that available today cannot use face recognition or color identification technologies, and additional identification methods are required.

In addition, today, there is no solution for accurately extracting (measuring) object dimensions from a video stream, which have important value in a variety of areas such as law enforcement, measurement of objects captured in a video stream for learning about these objects, characteristics, and more.

It is, therefore, an object of the present invention to provide a system and method for calibrating the field of view of a single camera in an accurate and quick manner.

It is another object of the present invention to provide a system and method for measuring and extracting object's sizes from a video stream.

It is a further object of the present invention to provide a method of dimensional calibration of an active FOV of a single camera (i.e., optimal FOV) that may significantly expand the use of "Reverse Projection" for objects measuring and video monitoring tasks.

It is yet another object of the present invention to provide a method for measuring the size of objects in an image by using a single camera.

Other objects and advantages of the invention will become apparent as the description proceeds.

SUMMARY OF THE INVENTION

The present invention relates to a method for calibrating the field-of-view (FOV) of a camera, comprising:
  Setting fixed installation parameters of a camera;
  Dividing the field-of-view (FOV) of the camera into a plurality of sectioned rays;
  Capturing images with said camera while a calibration board being moved, in terms of depth and angle with respect to the camera's FOV, along a path as defined by each of said sectioned rays;
  Processing said captured images for digitizing coordinates of the calibration board in accordance with its location on one or more specific sections at each of the sectioned rays;
  Creating a coordination matrix that comprises the digitized coordinates of the calibration board at multiple locations along a path as defined by each of said sectioned rays; and
  Performing extrapolation on said coordination matrix for generating a virtual grid at any location of the camera's FOV, thereby enabling to align the virtual grid with any object that appears in a video stream and to extract the sizes of said object from captured two-dimensional images.

According to an embodiment of the invention, the calibration board being moved from one section of a specific ray to another section in a specific order.

According to an embodiment of the invention, the method further comprises:
  monitoring a video stream and capturing a relevant frame from a video stream;
  determining x-y coordinates of the central point of an object in said frame;
  sending the x-y coordinates of said object to the coordination matrix for generating a corresponding measuring grid;
  aligning said measuring grid with said object, according to the x-y coordinates of its central point; and
  performing a measuring action of said object's sizes by calculations of the measuring grid aligned with said object.

According to an embodiment of the invention, the calibration board comprises squares with an equal and known size that forms a checkerboard-like pattern.

According to an embodiment of the invention, the calibration board is a virtual layer projected in the camera's field of view.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein:

FIG. 6 shows an example of a coordinates matrix that comprises the coordinates of all intersection points measured on each location of the calibration board with respect to all the rays, such as those shown by the visual layer in FIG. 5, according to an embodiment of the invention;

DETAILED DESCRIPTION OF THE PRESENT INVENTION

The present invention provides a method for calibrating an active FOV of a single camera. According to an embodiment of the present invention, from the calibration of the camera's active FOV, a coordinate matrix is obtained which remotely produces the virtual interpolation measurement network (e.g., similar to a dimensional calibration grid board) at any point within the image (a frame) extracted from a video stream (recorded by the single camera), while eliminating the need to be physically presence at the actual location where the video stream has been recorded. The basis of the active FOV of a camera is the ability to obtain (measure) coordinates of the measurement points marked on a calibration board (e.g., as indicated by numeral 71 in FIGS. 4, 5, 7 and 8A).

Figure 1:
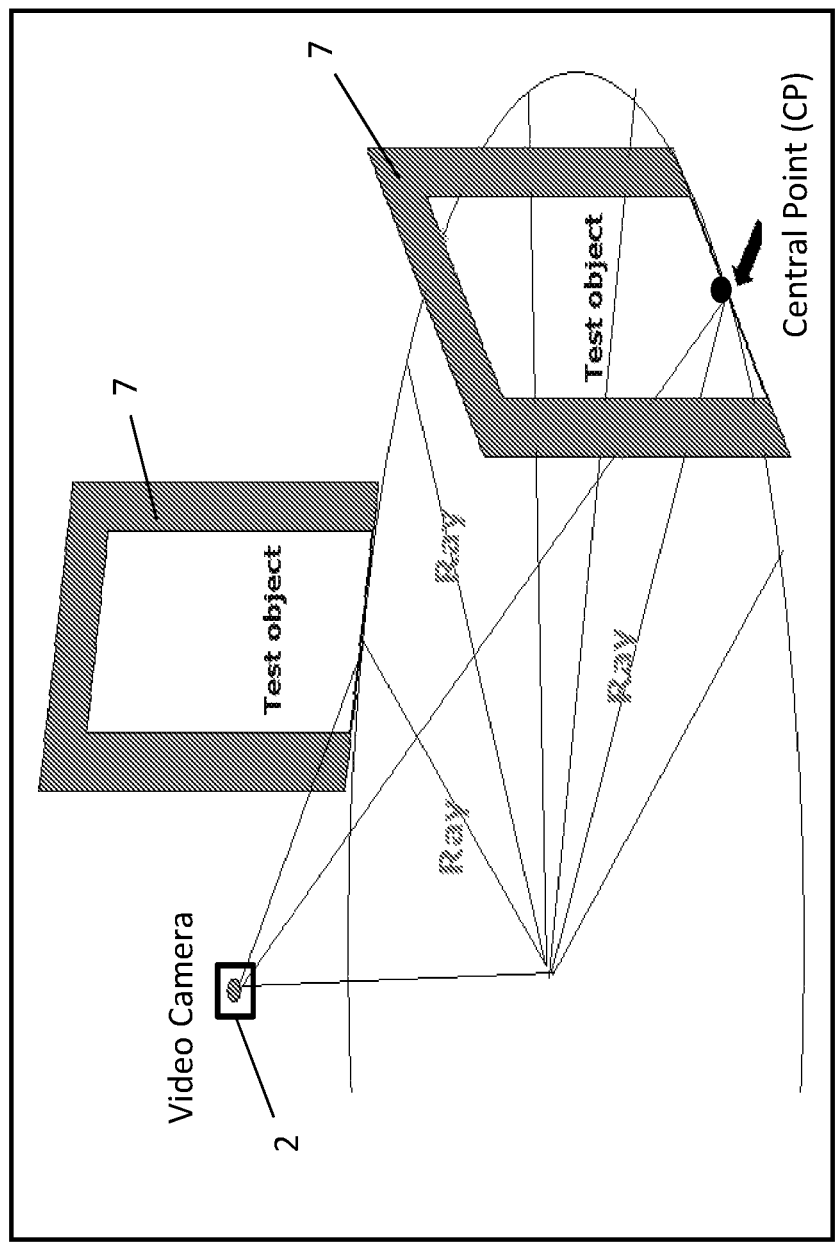
FIG. 1 schematically illustrates the active FOV of a camera with rays and central points with respect to the location and installation properties of the camera, according to an embodiment of the invention.
Figure 2A:
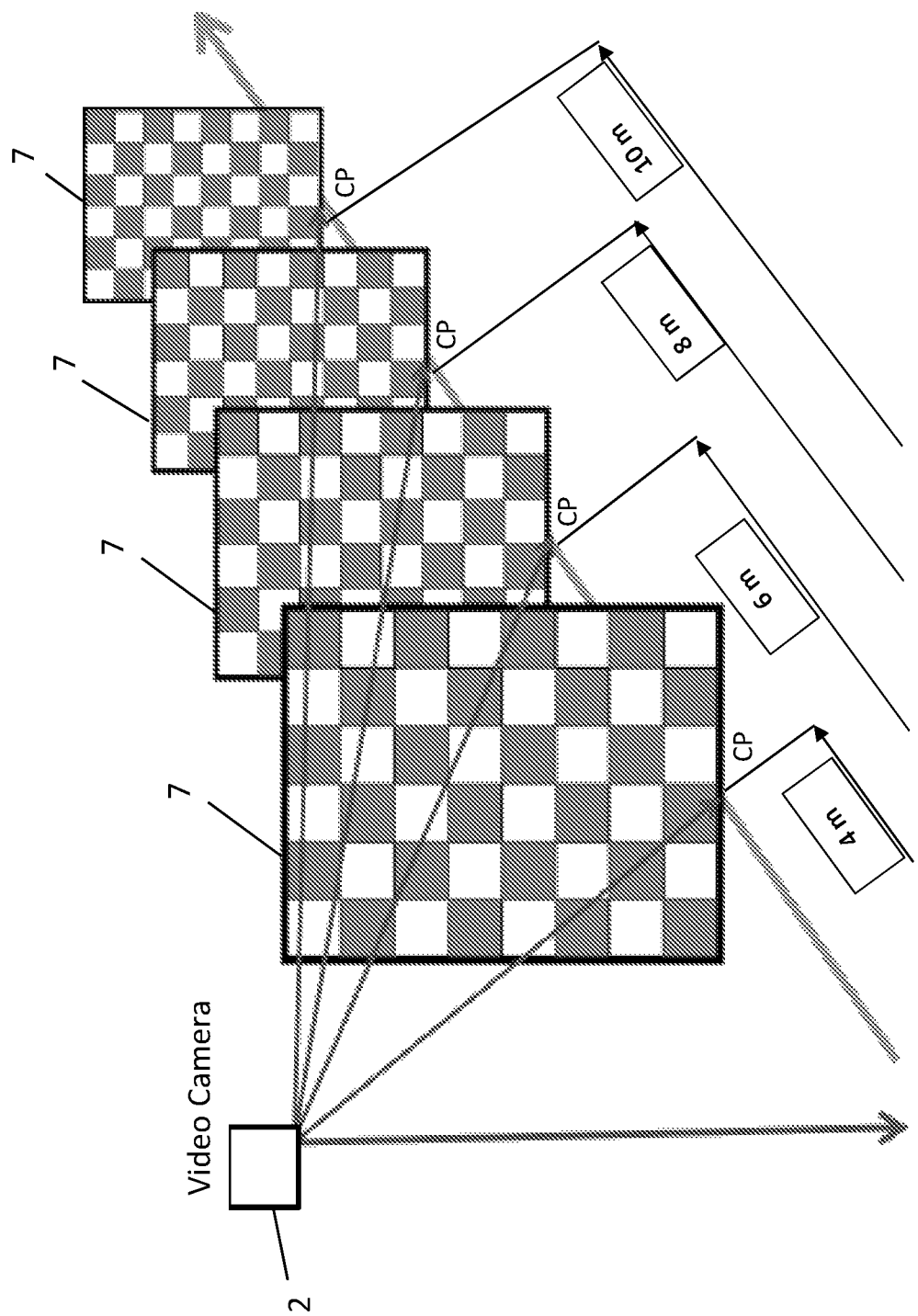
FIG. 2A schematically illustrates movements and positions of a calibration board with respect to the camera, along with one of the axis (rays) and the central point (CP), according to an embodiment of the invention.
Figure 2B:
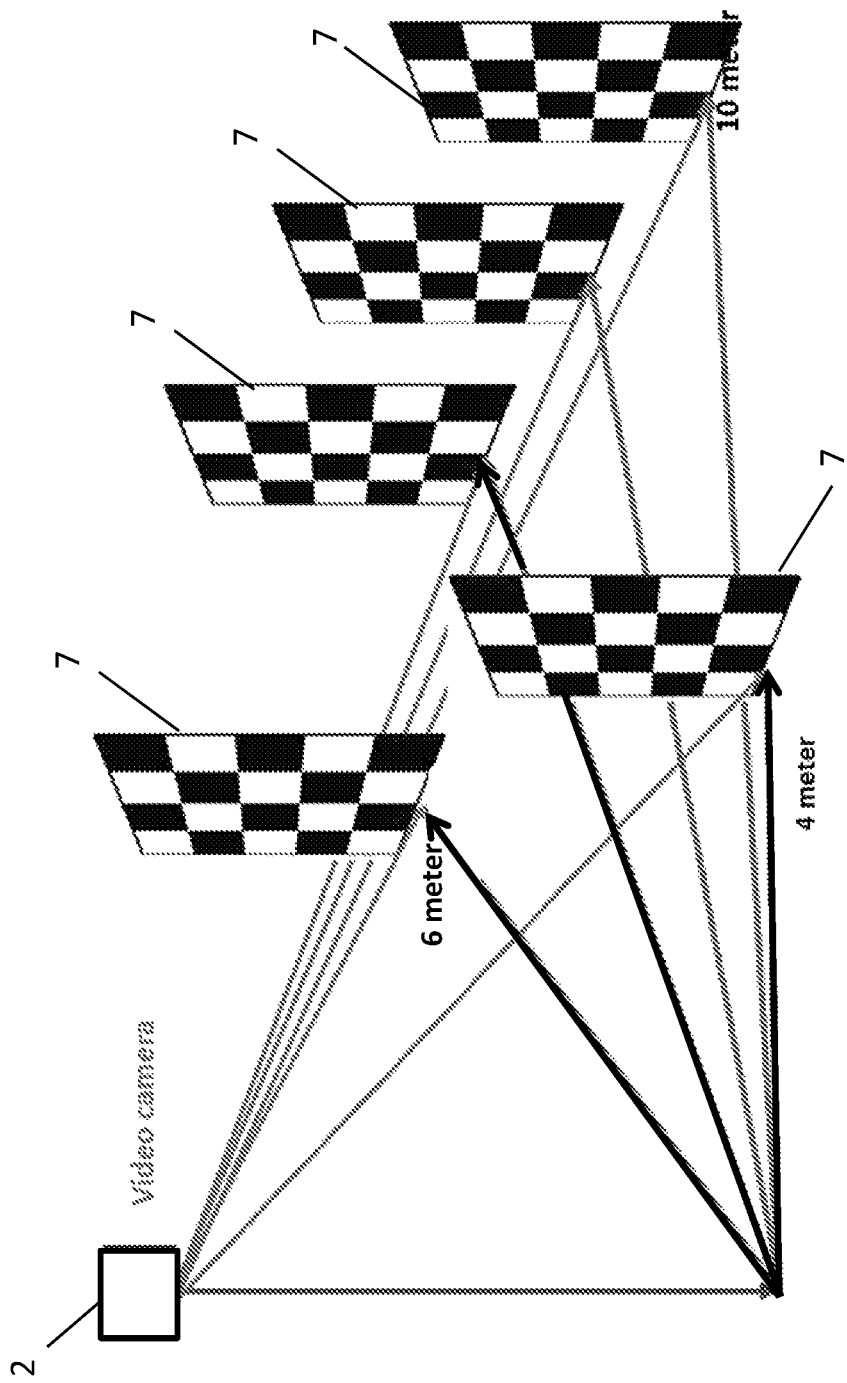
FIG. 2B schematically illustrates different position of the calibration board, wherein the arrows pointing to the center point (CP) of the lower base of the calibration board, according to an embodiment of the invention.

According to an embodiment of the invention, the calibration board may be located along rays transmitted from the base of the vert descending from the center of the camera's FOV (meeting point between the vertical and horizontal plane) and extending from this point at defined angles, e.g., as can be seen in FIG. 1 (that shows the active FOV of a camera 2). In FIG. 1, the active FOV is indicated by rays emanating from the projection point of camera 2 to the floor surface and from the center point (CP) of a test object 7 (e.g., a calibration board). FIG. 2A schematically illustrates movements and positions of the calibration board with respect to the camera, along with one of the axis (rays) and the central point (CP), according to an embodiment of the invention. FIG. 2B schematically illustrates the different positions of the calibration board, wherein the arrows pointing to the center point (CP) of the lower base of the calibration board, according to an embodiment of the invention.

Figure 3:
FIG. 3 shows an example of an image in which the active camera's FOV are marked (i.e., the marking indicates the rays) and divided into defined measured steps, according to an embodiment of the invention.
Figure 4:
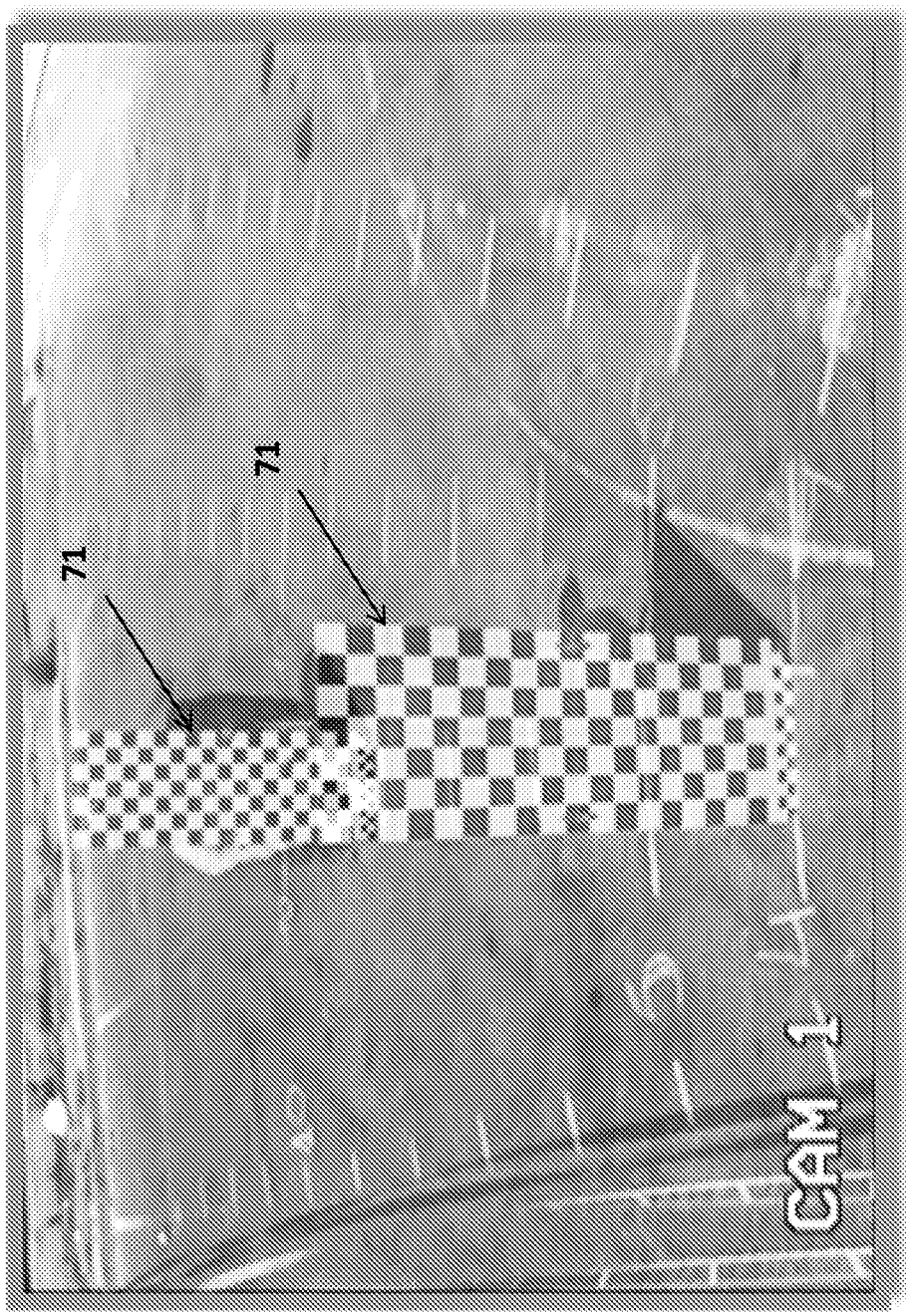
FIG. 4 shows an example of the image of FIG. 3 in which a calibration board with a pattern of black and white squares of known sizes is shown at different locations (i.e., different steps) along a path of a specific ray, according to an embodiment of the invention.

According to an embodiment of the invention, the active FOV of a camera is divided by rays into several angles. The division is made from the base of a vert descending from the center of the camera's FOV. Each ray is divided into defined sections. The dimensional calibration board is perpendicular to the distribution points along the length of each ray as its location is documented using the video camera for which the calibration is performed. FIG. 3 shows an example of marking the active camera's FOV (in a captured image from a video stream) with rays and dividing them into defined measured steps, according to an embodiment of the invention. FIG. 3 shows the actual marking of the active FOV of the camera, using rays and dividing them into defined measured steps as indicated by numeral 201. Of course, an increase in the number of rays and steps will increase the accuracy of the measurements. FIG. 4 shows an example of the image of FIG. 3 in which a calibration board with a pattern of black and white squares of known sizes is shown at different locations (i.e., different steps) along a path of a specific ray, according to an embodiment of the invention.

According to an embodiment of the invention, at first, setting up specific installation parameters of the camera (i.e., such as height and viewing angle) and dividing and marking the active camera's FOV, e.g., by marking several rays at different angles and dividing the rays into sections/steps, e.g., as shown in FIG. 3. The division is made from the base of a vert descending from the camera's center. Each ray is divided and marked along its length for defined steps/sections. The markings of sections/steps on each ray are distant from the camera and are known and documented. As aforementioned hereinabove, the calibration process uses a calibration board (e.g., such as the calibration board shown in FIG. 4) whose dimensions (length and width) are fixed and known, including the size of the squares that forms the checkboard-like pattern. The calibration board is positioned perpendicular to each ray and moves along the path of each ray according to the marked steps, where its position (at each marked step) is recorded by the camera (as a video stream) for which its FOV is calibrated. Everywhere in the image, the distance of the calibration board from the camera lens varies, and therefore the captured size of the calibration board by the camera varies. That is, in every calibration image taken by the camera at different locations of the calibration board, the calibration board looks different in size, but as mentioned, its dimensions are constant and well-known.

In each location, the distance of the calibration board from the camera's lens changes, and accordingly, its size as seen by the camera changes (i.e., in each extracted image, the calibration board has different dimensions), but of course, the dimensions of the calibration board are fixed and known.

Figure 5:
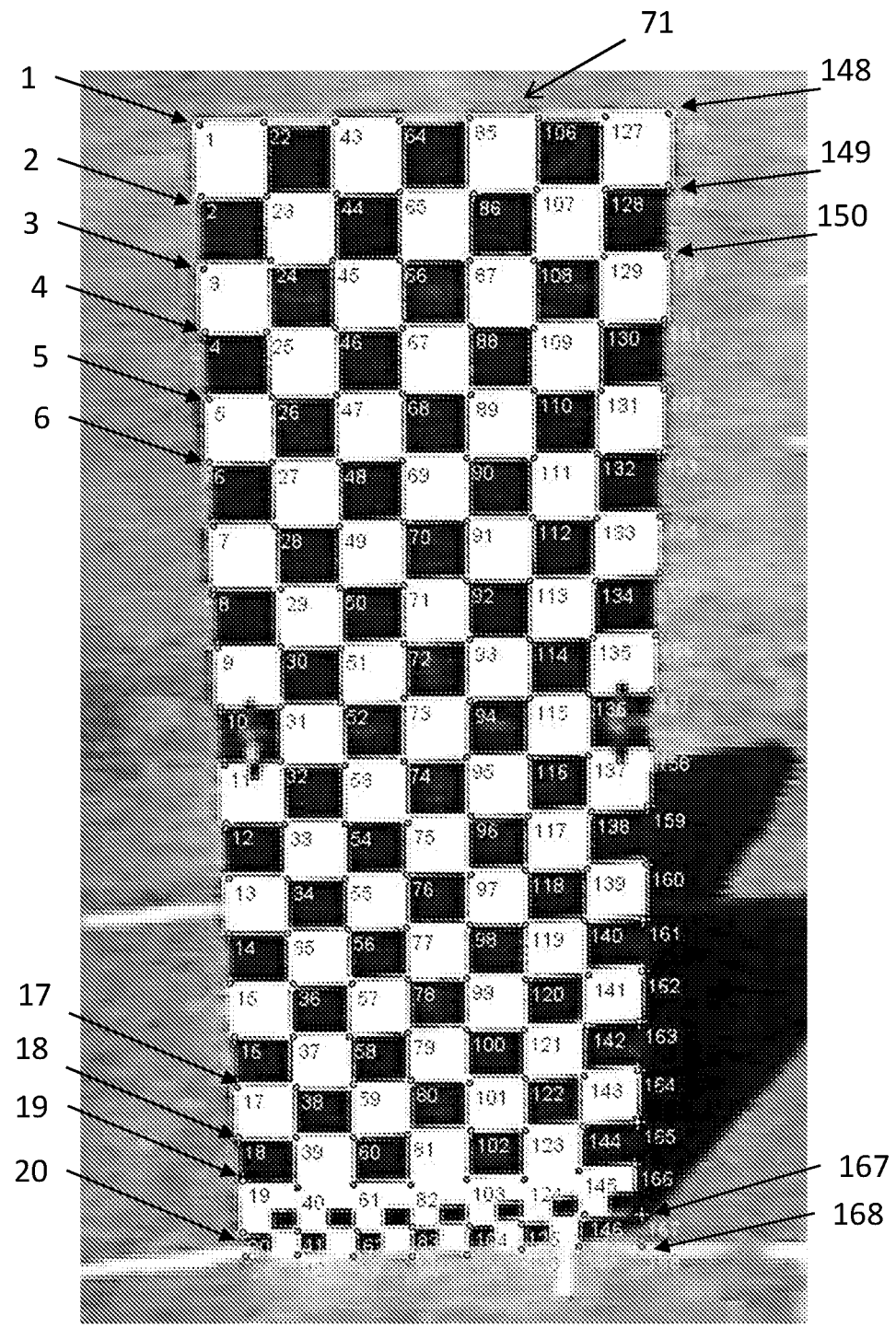
FIG. 5 shows an image of a physical calibration board with a visual layer showing the coordinates of the intersection points of the squares, the physical calibration board is provided with known dimensions, which comprises squares with equal and known size that forms a checkerboard-like pattern, according to an embodiment of the invention.

According to an embodiment of the invention, dedicated image processing software analyzes the recorded video streams of the movement of the calibration board (in steps according to the location of the markings). For example, the image processing software may extract the images (i.e., selected frames from the recorded video stream) in which the calibration board is shown located at the position of the marking along each path/ray, and in each extracted image, the image processing software digitizes the coordination of the calibration board (i.e., the intersection points of the squares with the known sizes that from the pattern on the calibration board digitized as schematically shown in FIG. 5 and indicated by numerals 1-168 with respect to the corner of each square of the calibration board).

FIG. 6 shows an example of a coordinate's matrix that comprises the coordinates of all intersection points measured on each location of the calibration board with respect to all the rays and in accordance with the marked steps, such as the markings shown in FIG. 3, according to an embodiment of the invention. This matrix constitutes a database (coordinates—intersection points) that can be processed by a dedicated software module. For example, a least-squares method can be applied to the matrix's data in order to calculate the best parameters of the vertical and horizontal grid lines (real numbers), thus enabling to generate virtual calibration boards (e.g., in a lattice form) at any point in the active FOV of the camera (even in locations in which the calibration board has not been located during the recording). The location of the virtual board or virtual network on the active FOV will be at a center point—CP (the intersection point of the lower part of the virtual board with the ray).

Because the location of the measuring object in the active FOV is unknown, it is necessary to obtain an image (video frame) of the dimensional calibration board at a suitable point, such that its lower limit will be perpendicular to the camera (e.g., as indicated by Central Point CP in FIG. 1).

According to an embodiment of the invention, the calibration process may involve the following procedure:
recording a video stream with a camera in a calibrated area (indoor/outdoor) where the dimensional calibration board moves along the rays exiting from a base point (i.e., a base point—a meeting point between the vertically descending center of the camera's FOV and the horizontal plane), the plane of the dimensional calibration board should be perpendicular to the ray (as shown in FIG. 1); and
building a database of images (video frames) for a calibrated FOV by selecting and extracting images from the video stream, where the dimensional calibration board moves along the rays (at the point of division into sections), with its plane perpendicular to the ray (FIG. 1). It is necessary to record the distance of the dimensional calibration board from the camera throughout each ray (FIG. 1) for the purpose of processing the video frames stored in the database. Moving the dimensional calibration board along each ray at a known distance from the camera will allow extrapolating the dimensional calibration image to those locations that cannot be positioned at the correct angle and/or cannot be positioned at all).

The Calibration Process of a Camera's FOV

According to an embodiment of the invention, the calibration process can be executed in any location that can be used as a calibration site (e.g., a warehouse, an outdoor location, etc.). The results of the calibration can be used on any video stream captured by any camera with similar properties (i.e., same model, installation properties such as height and lens viewing direction, and any other relevant parameters).

In the calibration site, the calibration process may involve the following steps:
Installing a camera in the calibration site (with specific installation properties, height, camera angle, etc.);
Placing one or more calibration boards (e.g., one may use several identical boards) in different locations in the active camera's FOV, or moving a single calibration board from one location to another during the recording. The calibration board (such as a physical calibration board shown in FIG. 3), whose dimensions (length and width) are fixed and known, at different locations in terms of depth and angle in the field of view of the camera. For example, the calibration board may comprise squares with an equal and known size that forms a checkerboard-like pattern. As will be appreciated by a person skilled in the art, other forms of calibration board and patterns can be used for the calibration process;
Recording video stream, with the installed camera, in which the calibration board being moved along different paths (i.e., rays) within the camera active FOV (e.g., the calibration board being moved from one location to another in accordance with predefined markings/steps during the recording of the video stream, as shown in FIG. 4);
Extracting selected images from the recorded video stream in which a dimensional calibration board appears in the desired locations (e.g., at each step along each specific path); and
Creating a database from the extracted images, documenting the dimensional calibration board located (perpendicular) at the desired locations/points along each ray at defined distances from the camera.
For example: in case that the active viewing angle of the camera installed on the calibration site is 60 degrees, and the active FOV of this angle from the camera extends about 10 meters. According to the above data, the active FOV can be divided into four rays (15 degrees between each ray) and the captured location of the board along each ray (4 rays in total, wherein the length of each ray is 10 meters). In this example, the database will contain 40 images.
Each image in the repository contains information about the position of the calibration board with respect to the specific ray and its distance from the camera. The coordinates of each calibration board stored in the database (the intersection points of the squares, e.g., squares with an equal and known size that forms a checkerboard-like pattern) are digitized (integers in pixels) as shown in FIG. 5. This data is converted to a coordinate matrix, e.g., in the form of a text file, for further processing using a dedicated software module.

In order to cover a variety of installation possibilities of the camera (e.g., at different locations), the above steps may be repeated with different installation properties of the camera.

Figure 7:
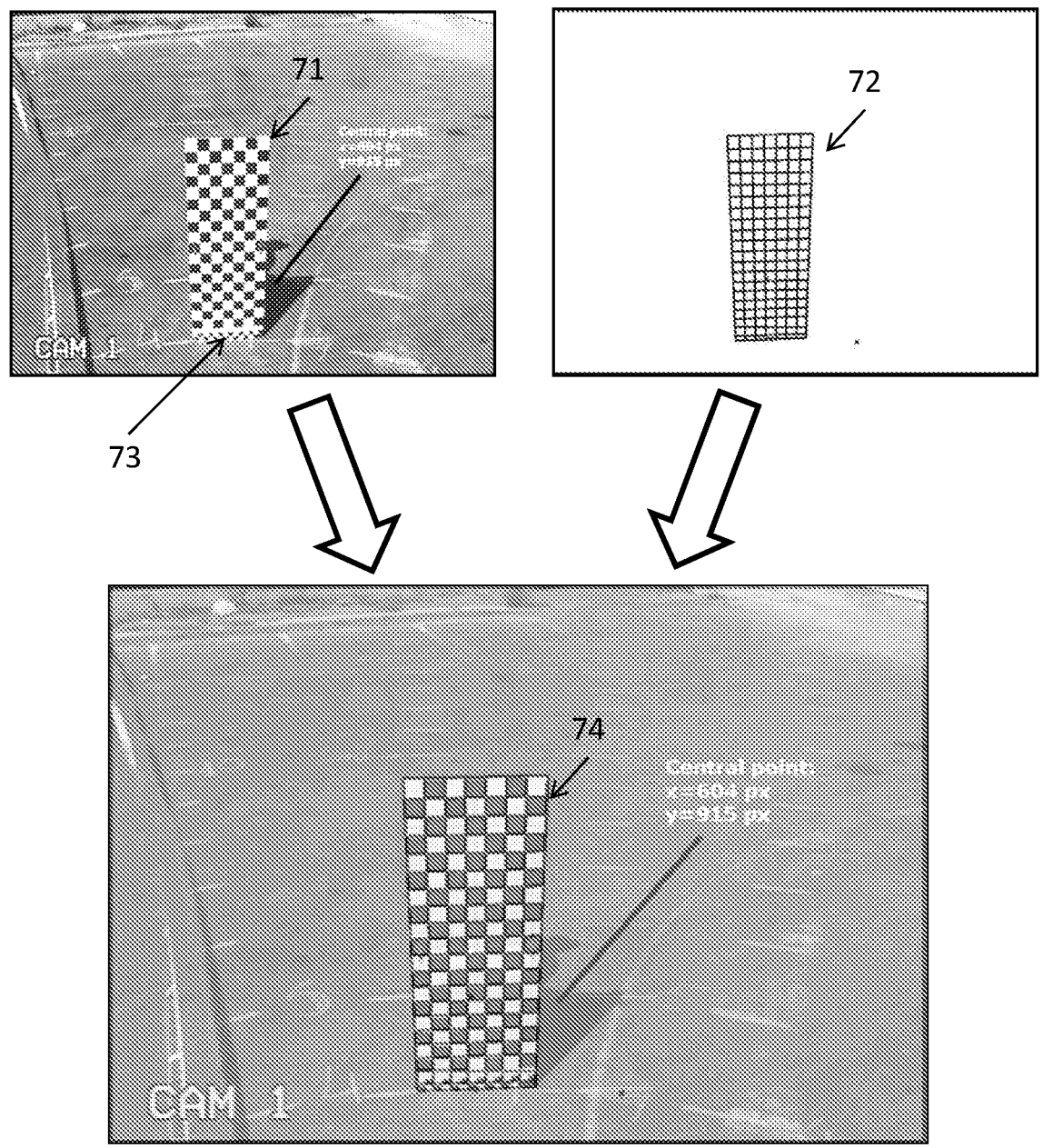
FIG. 7 schematically illustrates a matching verification stage between a physical calibration board and a virtual representation of that board, according to an embodiment of the invention.

The coordinate matrix (e.g., as shown in FIG. 6) can be used for various applications to perform linear measurements of objects from a video stream. Before using the coordinate matrix, a control step may be performed to verify the matching of the physical calibration boards to the virtual ones, for example, as shown in FIG. 7. In FIG. 7, three images are shown, a first image that shows a physical calibration board 71, a second image that shows a virtual board 72 that represents the physical calibration board 71 and its location in the first image, and a third image the shows the matching between the physical calibration board 71 and virtual board 72. As indicated by numeral 74 in the third image, a combination of the virtual board 72 with physical calibration board 71 is shown. In this example, virtual board 72 is located on top of the physical calibration board 71 in an accurate manner.

Figure 8A:
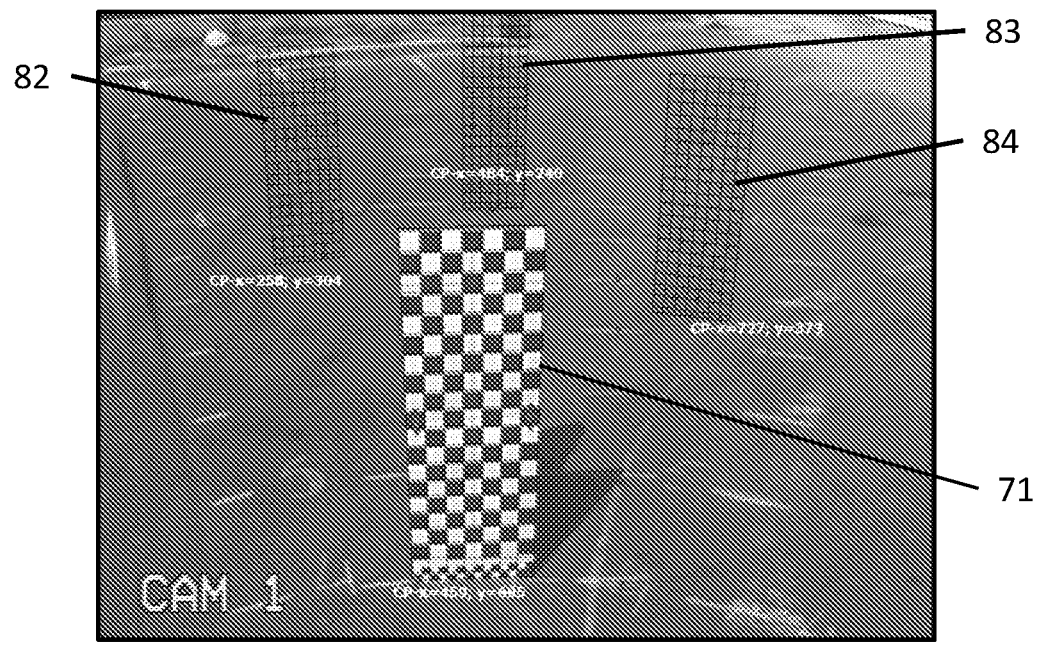
FIG. 8A shows a plurality of virtual boards created in accordance with corresponding locations of physical calibration board at different locations, according to an embodiment of the invention.
Figure 8B:
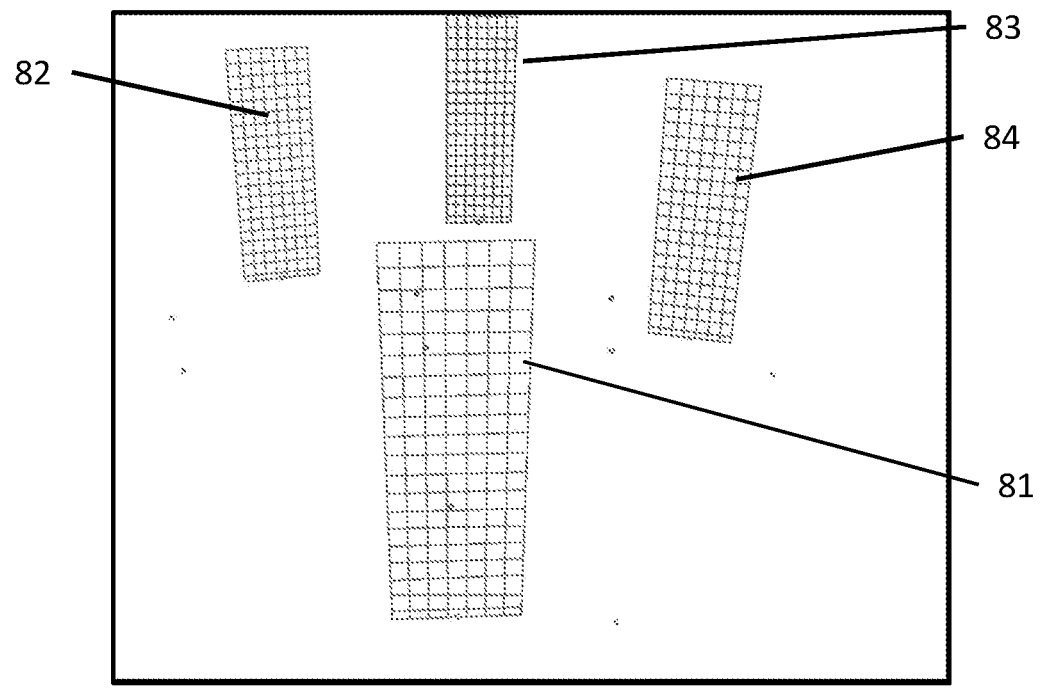
FIG. 8B schematically illustrates a digital representation of the plurality of the virtual boards shown in FIG. 8A.

For verification, an image is selected with one of the calibration boards at a specific step along a specific ray, e.g., as indicated by physical calibration board 71 in the first image. Coordinates of the center point (CP) are set on the selected image of physical calibration board 71 (as indicated by numeral 73. Entering CP coordinates and processing them in a dedicated software module generates a corresponding virtual network that represents the physical calibration board 71 in the given space of the analyzed image (e.g., as indicated by virtual board 72 in the second image). The combination of a virtual calibration board with the real (superimposition) will show the degree of suitability of the entire process performed and described hereinabove (as visually indicated by board 74 that combines the physical calibration board 71 and the virtual board 72). FIG. 8A shows a plurality of virtual boards 82, 83, and 84 created in accordance with corresponding different locations of physical calibration board 71. FIG. 8B schematically illustrates a digital representation of the plurality of the virtual boards 82-84 shown in FIG. 8A and in accordance with the exact dimension of the physical calibration board 71 as seen by the camera's FOV at different locations. FIG. 8B further shows a digital representation 81 of the physical calibration board 71 in accordance with its temporary location, as shown in FIG. 8A. The size of the squares in the grid (of the virtual board) changes according to the spatial position of the physical calibration board 71, consequent to the calibration that has been done to the camera's field of view (i.e., each virtual board 81-84 represents the physical board 71 at a different location in the image, as the dimensions of the physical board "looks" different by the camera at each physical location in the camera's FOV). The size of the squares in the grid can be used to calculate and extract the dimensions of an object that appears in the video stream.

Figure 9:
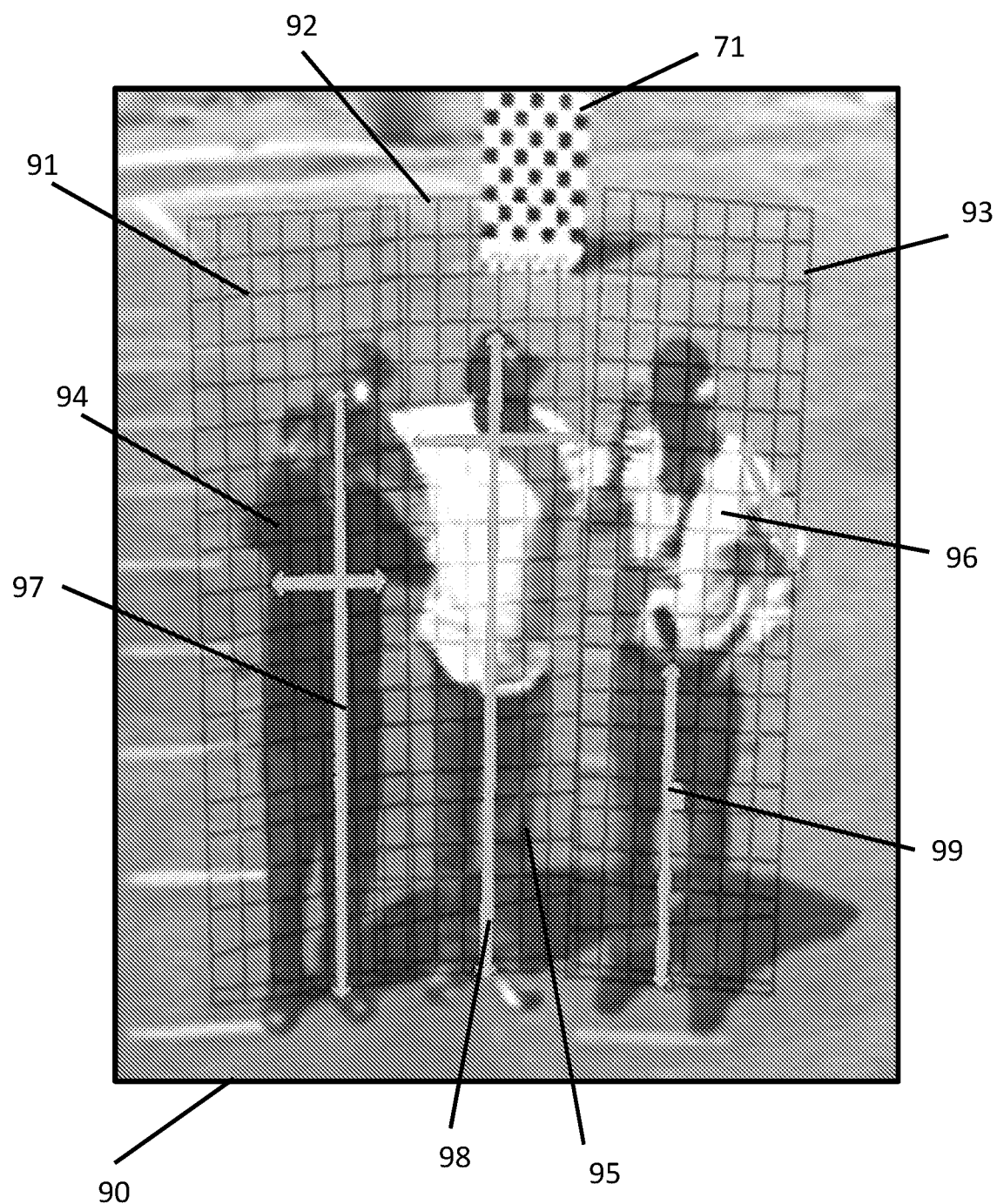
FIG. 9 shows an example of performing human body measurements using the virtual board shown in FIG. 8B.

FIG. 9 shows an example of performing human body measurements of three persons 94, 95 and 96 (anthropometric measurements) from an image 90 (i.e., height, chest width, shoulder width, waist height and more, e.g., as schematically indicated by the illustrated arrows 97, 98 and 99) by using virtual boards 91, 92 and 93 (similar to those shown in FIG. 8B), where the size of the squares in the grid of each virtual board can be used to calculate and extract the dimensions of an object that appears in the video stream. In this example, virtual boards 92-94 are placed as virtual layers on top of the three persons 94-96 and are used to calculate body measurements of these persons. Of course, other objects can be measured, and the virtual boards can be used for other usages. For example, the coordinate matrix can be used for different applications in order to extract objects' measurements from a video stream.

Figure 10:
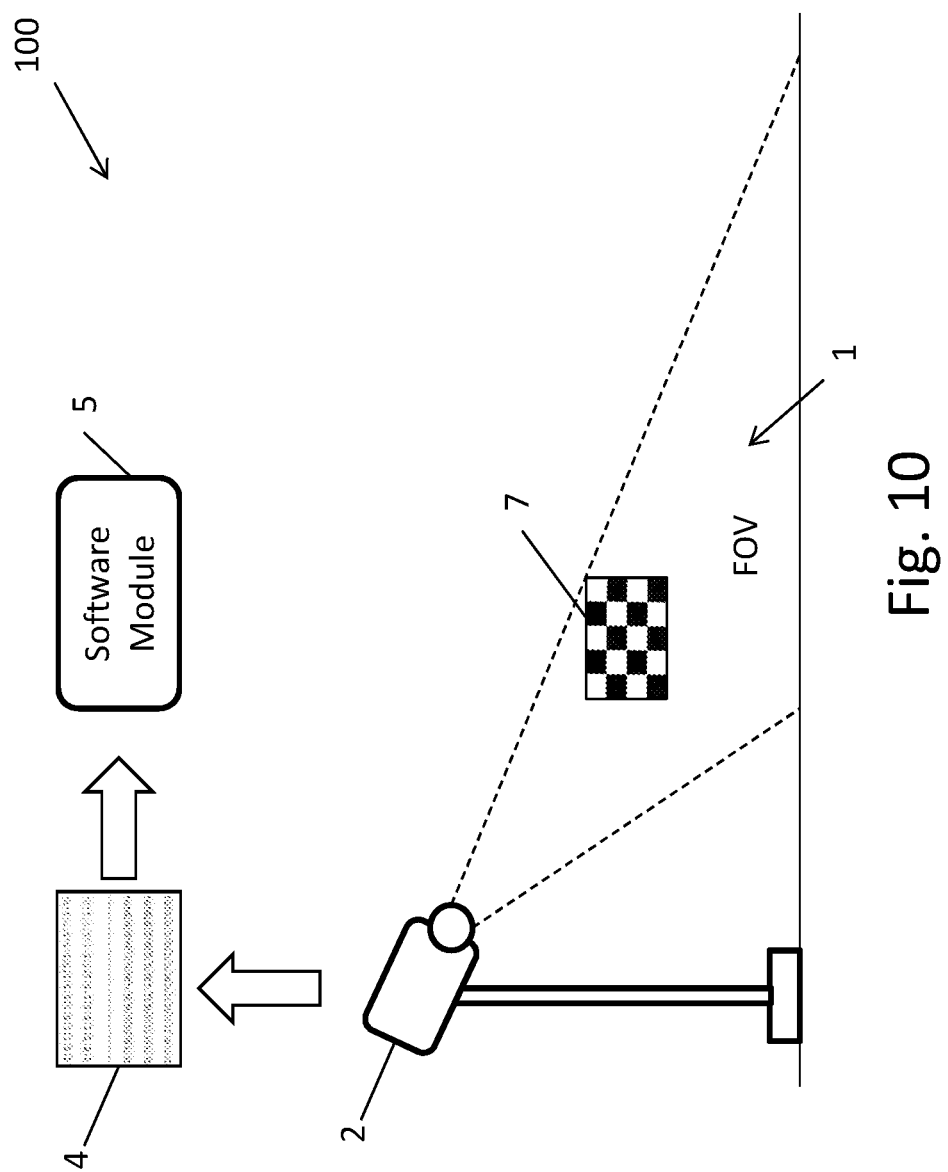
FIG. 10 schematically illustrates a block diagram of the components of a system for calibrating the field of view of a camera installed in a specific location with a portable calibration board, according to an embodiment of the invention.

FIG. 10 schematically illustrates a block diagram of the components of a system 100 for calibrating the field of view of a camera 2 installed in a specific location with a portable calibration board, according to an embodiment of the invention. The present invention proposes a system and method for calibrating the field of view 1 of camera 2 with a portable calibration board 7 (i.e., a test object) and by this calibration, measuring the body dimensions of a person or some other object in a given video stream, e.g., which can be used for identification of this person or object. More specifically, using the calibration process described herein, a coordinate matrix 4 of the active FOV of camera 2 is created and can be processed by using dedicated software 5. As a result, a virtual "board" (e.g., a mesh-like digital layer that represents the form of the physical calibration board) can be created and placed at any point within an image (a frame) of the video stream. This virtual "board" enables measurement of the linear/object dimensions, which can be used, inter alia, for identification purposes and/or for other purposes and actions.

A major advantage of the method of the present invention is the creation of a digital coordinate matrix of a calibration board for each specific camera model, which allows: creating a virtual calibration board (virtual matrix) and performing real-time (on-line) measurements from an existing video stream from a remote location (i.e., without actually being located at the location where the recording of the video stream occurs by the local camera).

The system of the present invention creates coordinate matrix 4 in accordance with the relative changes in the size of the calibration board as captured by the camera's lens, as a function of its spatial location in the camera's field of view (i.e., at different locations in terms of depth and angle of the field of view of the camera), as described in details hereinabove. The system may further perform extrapolation in order to include locations in the FOV where the calibration board was not placed during the calibration process. As long as more samples are taken (i.e., placing the calibration board in more locations in the camera's field of view), the accuracy of the calibration increases.

Figure 11:
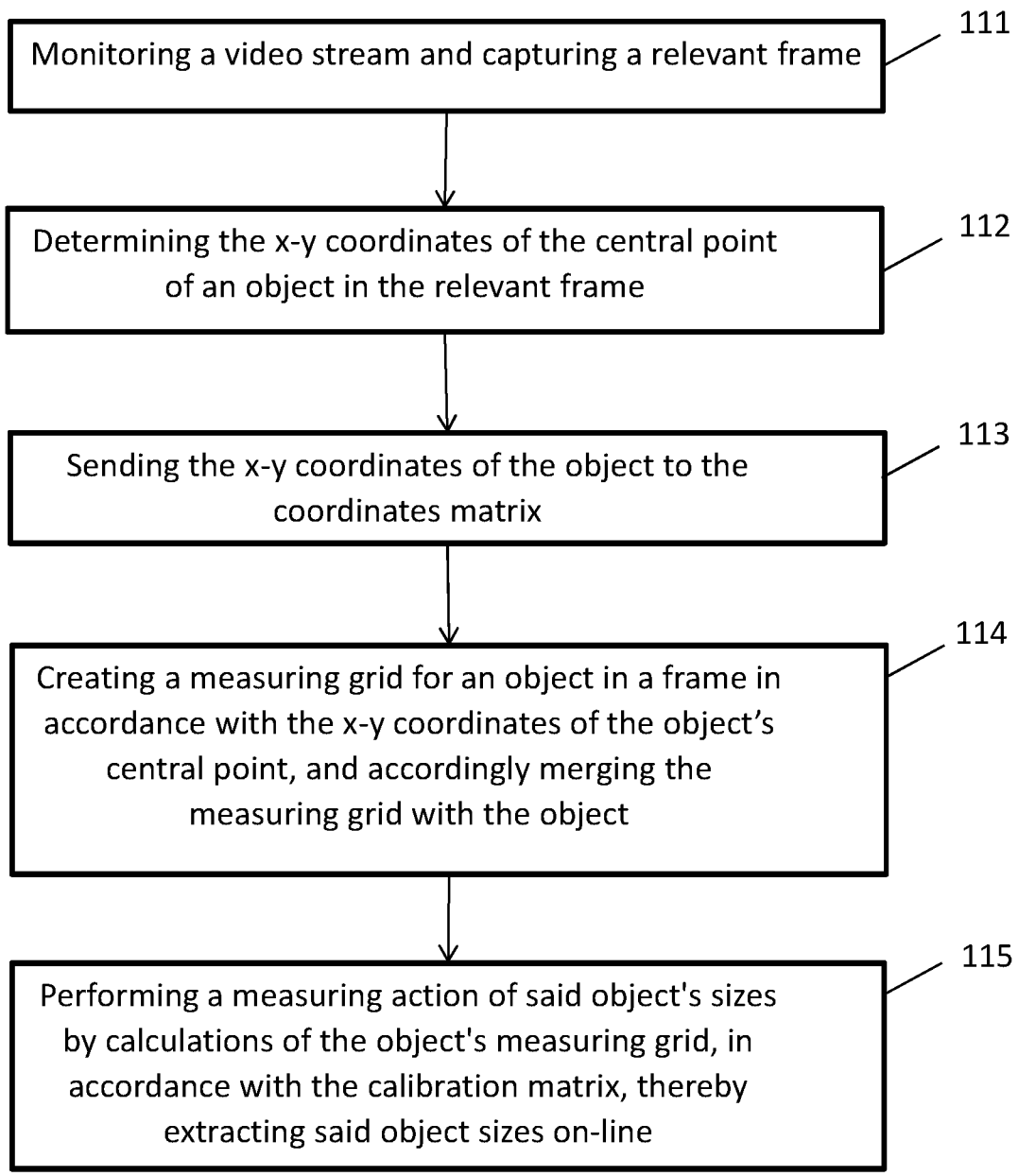
FIG. 11 is a flowchart showing the extraction process of the object's sizes from video stream frames, according to an embodiment of the invention.

FIG. 11 is a flowchart showing the extraction process of the object's sizes from video stream frames, according to an embodiment of the invention. According to an embodiment of the invention, the process of utilizing the calibration matrix for extracting sizes of an object may involve the following procedures:

At step 111, a video stream monitoring is being performed, and a relevant frame is being captured. At the next step 112, the x-y coordinates of the central point (CP) of an object in the relevant frame is being determined. At the next step 113, the x-y coordinates are being sent to the calibration matrix. At the next step 114, creating a measuring grid (i.e., a virtual board) at each location of the object in the image with respect to the central point (CP) at the bottom portion of the object, and merging the created measuring grid with the object in accordance with the CP in each specific frame (this virtual board is created in each specific location of the object in each specific frame with respect to the CP of the object. For example, in case the object moves in the recorded video stream, multiple virtual boards will be created, each of which with respect to the coordinates of the CP in each specific frame, or at least one measuring grid will be created with respect to the CP in case the object is static in the video stream, e.g., as shown in FIG. 9), according to the x-y coordinates of the central point of the object. At the next step 115, a measuring action of the object sizes is being performed by a dedicated software module in accordance with the measuring grid that is aligned with the object and through which (by processing the square sizes of the grid that are relative to the physical calibration board) the object's sizes are being extracted.

The advantage of the current invention is that the physical calibration method is accurate and not depends on the position of the camera. Given the camera parameters (type, height, and angle), the calibration can be performed anywhere. Also, this calibration method is quick because the calibration board is placed in a relatively small number of points in the field of view of the camera, and the other points in the calibration matrix are calculated by extrapolation.

An important advantage of the calibration method proposed by the present invention is that this method is using a single camera in order to extract sizes of an object, in particular, from an existing video stream.

The method proposed by the present invention describes a quick, inexpensive, and accurate calibration that does not depend on the location where the video stream has been recorded.

The invention claimed is:

1. A method for calibrating a field-of-view (FOV) of a camera, comprising:
   a) Setting fixed installation parameters of the camera;
   b) Dividing the FOV of the camera into a plurality of sectioned rays;
   c) Capturing images with said camera while a calibration board is moved, in terms of depth and angle with respect to the FOV of the camera, along a path as defined by each of said plurality of sectioned rays;
   d) Digitizing coordinates of the calibration board from the images captured with said camera, wherein the digitized coordinates correspond to a location of the calibration board on one or more specific sections at each of the plurality of sectioned rays;
   e) Generating a coordination matrix that comprises the digitized coordinates of the calibration board at multiple locations along the path as defined by each of said plurality of sectioned rays;
   f) Performing extrapolation on said coordination matrix for generating a virtual grid at any location of the FOV of the camera;
   g) Aligning the virtual grid with an object that appears in a video stream captured by the camera according to the coordinates of the object in the video stream; and
   h) Measuring a size of said object based on calculations performed using the virtual grid aligned with the object.

2. The method of claim 1, wherein capturing the images with said camera comprises capturing the images with said camera while the calibration board is moved from one section of a specific ray of the plurality of sectioned rays to another section in a specific order.

3. The method of claim 1, further comprising:
   a) monitoring the video stream to identify a relevant frame containing the object;
   b) determining x-y coordinates of a central point of said object in said relevant frame; and
   c) using the x-y coordinates to generate the virtual grid and align the virtual grid with the object.

4. The method of claim 1, wherein the calibration board comprises squares with an equal and known size that form a checkerboard-like pattern.

5. The method of claim 1, wherein the calibration board is a virtual layer projected in the FOV of the camera.

6. A system for calibrating a field of view (FOV) of a camera, comprising:
   a) a single camera with known parameters and installation formation;
   b) a portable calibration board with fixed and known dimensions, wherein a surface of said portable calibration board comprises squares with an equal and known size that form a checkerboard-like pattern;
   c) a software module configured to:
   Digitize coordinates of the portable calibration board from images captured by the camera;
   Generate a coordination matrix from the digitized coordinates;
   Perform extrapolation on the coordination matrix to create a virtual grid at any location in the FOV of the camera; and
   Align the virtual grid with an object in a video stream to measure a size of the object.

7. The system of claim 6, wherein the software module is further configured to monitor the video stream, identify a frame in the video stream containing the object, and determine x-y coordinates of a central point of the object in the frame.

8. The system of claim 6, wherein the portable calibration board is positioned at different locations in the FOV of the camera within the images captured by the camera, and
   wherein the software module is configured to perform the extrapolation on the coordination matrix to create the virtual grid at any location of a plurality of locations in the FOV of the camera, wherein the plurality of locations in the FOV of the camera includes the different locations of the portable calibration board within the images captured by the camera and further locations other than the different locations of the portable calibration board.

* * * * *